United States Patent
Yoshimura et al.

[11] Patent Number: 6,041,284
[45] Date of Patent: Mar. 21, 2000

[54] APPARATUS AND METHOD FOR DETERMINING COORDINATES OF A DESIGNATED POINT

[75] Inventors: Yuichiro Yoshimura, Kamakura; Atsushi Tanaka, Yamato; Ryozo Yanagisawa, Inzai; Katsuyuki Kobayashi; Hajime Sato, both of Yokohama, all of Japan

[73] Assignee: Canon Kabushiki Kaisha, Tokyo, Japan

[21] Appl. No.: 08/879,603

[22] Filed: Jun. 20, 1997

[30] Foreign Application Priority Data

Jun. 25, 1996 [JP] Japan .................................. 8-164465

[51] Int. Cl.$^7$ .................................................. G08C 21/00
[52] U.S. Cl. ...................... 702/56; 178/18.04; 178/19.02; 367/907; 702/95; 702/150
[58] Field of Search ................................ 702/56, 95, 176, 702/150, 158; 364/190; 178/18.04, 19.02; 367/907

[56] References Cited

U.S. PATENT DOCUMENTS

| | | | |
|---|---|---|---|
| 4,886,943 | 12/1989 | Suzuki et al. | 345/173 |
| 4,931,965 | 6/1990 | Kaneko et al. | 364/578 |
| 5,438,872 | 8/1995 | Kobayashi et al. | 73/597 |
| 5,491,305 | 2/1996 | Kawakami et al. | 178/19 |
| 5,610,838 | 3/1997 | Tokioka et al. | 702/56 |

FOREIGN PATENT DOCUMENTS 7-160407  6/1995  Japan .

*Primary Examiner*—Marc S. Hoff
*Assistant Examiner*—Hien Vo
*Attorney, Agent, or Firm*—Fitzpatrick, Cella, Harper & Scinto

[57] ABSTRACT

The present invention detects coordinates of a designated point and includes a vibration transmission plate having anisotropic properties such that vibrations from a vibration generation source applied to the vibration transmission plate propagate through the vibration transmission plate with differing vibration transmission velocities depending on a direction of transmission of vibration. A plurality of vibration detection units are provided for detecting vibrations transmitted through the vibration transmission plate, and a determination unit determines coordinates of the vibration generation source by measuring time periods of propagation of vibrations through the vibration transmission plate from the vibration generation source to one or more of the vibration detetion units. Further, the vibration transmission plate and the plurality of vibration detection units are provided such that bisectors of angles made by two line segments each connecting two opposing vibration detection units from among the plurality of vibration detection units coincide with axes of anisotropy of the vibration transmission plate.

22 Claims, 11 Drawing Sheets

DISTANCE FROM VIBRATION SENSOR

DISTANCE FROM VIBRATION SENSOR

DISTANCE FROM VIBRATION SENSOR

DISTANCE FROM VIBRATION SENSOR

APPARATUS AND METHOD FOR DETERMINING COORDINATES OF A DESIGNATED POINT

BACKGROUND OF THE INVENTION

1. Field of the Invention

This invention relates to a coordinate input apparatus for detecting the coordinates of a designated point from a vibration transmission time on a vibration transmission plate, and a method for controlling such an apparatus.

2. Description of the Related Art

Coordinate input apparatuses are known in which a vibration is input onto a vibration transmission plate by a vibrating pen incorporating a piezoelectric element or the like, and the coordinates of a point where the vibration is input are detected by a plurality of sensors provided on the vibration transmission plate.

In coordinate calculation of the coordinate input apparatus for detecting vibration, a method is generally known in which the transmission velocity of a vibration wave transmitted through the vibration transmission plate is obtained in advance, the obtained velocity is used as a constant, and the coordinates of the input point are obtained from the distance from the vibrating pen to each of the vibration sensors obtained by performing calculations, such as multiplication of a vibration transmission time from the vibrating pen to the vibration sensor by the constant. Particularly when using a Lamb wave (plate wave) as the vibration wave transmitted through the vibration transmission plate, the transmission velocity is conventionally obtained from the detected value of the frequency of the vibration and a specific value of the thickness of the plate utilizing the fact that the transmission velocity of the Lamb wave depends on the thickness of the plate and the frequency, when the transmission velocity is not actually measured.

More specifically, as a conventional example, Japanese Patent Laid-Open Application (Kokai) No. 7-160407 (1995) proposes the following approach. That is, based on the discovery of the fact that the group velocity is obtained as a function of only the thickness of the plate, in the setting of the sound velocity of a Lamb wave, first, the frequency is measured from the phase synchronism of a detection signal, and the phase velocity is derived from the measured value and the thickness of the plate. The group velocity is derived only from the thickness of the plate. This proposal aims at improvement in accuracy in position detection, as well as improvement in reliability, in mass production capability, and the like.

However, as for the transmission velocity in the conventional coordinate input apparatus for detecting vibration, the value is obtained for each of the vibration sensors to provide the constant for calculating the coordinates, or the mean value of the obtained values for the respective sensors is used as the constant, or the value obtained for a representative vibration sensor is used as the constant for all of the vibration sensors. As a result, the following problems arise.

First, in the approach in which the value is obtained for each of the vibration sensors to provide the constant for calculating the coordinates, there is a problem in mass production capability in industrialization. That is, measuring and calculating operations corresponding to the number of the vibration sensors are required, thereby increasing the number of processes, and a burden on a calculation circuit for calculating the coordinates. In the approach in which only one constant is used for all of the vibration sensors, no problem arises when the vibration transmission plate is made of a homogeneous medium. However, when the vibration transmission plate has anisotropy in the vibration transmission velocity depending on the direction of the transmission of vibration, the problem that accuracy in the detection of the coordinates is degraded arises. A description will now be provided of the case of using the vibration transmission plate having anisotropy with reference to FIGS. 14 and 15.

FIG. 14 is a schematic diagram illustrating the configuration of a vibration transmission plate and vibration sensors in a typical conventional coordinate input apparatus for detecting vibration. This vibration transmission plate has anisotropy in the vibration transmission velocity depending on the direction of the transmission of vibration. The vibration sensors are represented by A, A', B and B' as shown in FIG. 14.

FIG. 15 illustrates an error ΔL in the distance from each of the sensors to the vibrating pen obtained from a delay time in the conventional coordinate input apparatus for detecting vibration. The error is calculated by using the mean value of the vibration transmission velocity values of the respective sensors as a constant. Since the object of this description is to show problems in the conventional approach illustrating the results of calculation of the distance, the detail of the calculation method will be described later in embodiments of the present invention. The error ΔL shown in FIG. 15 is measured for each of the vibration sensors by scanning the vibration transmission plate in a diagonal direction with the vibrating pen. In FIG. 15, the abscissa represents the distance from the vibrating pen, and the ordinater represents the error ΔL.

The central position of the scanning distance is used as a reference point, where the error is adjusted to be zero. Acordingly, in FIG. 15, the error is small at central portions. As is apparent from FIG. 15, the error AL has maximum values at the shortest point and the longest point from the vibrating pen separated from the reference point. The tendency of variations differ, i.e., is opposite, between a pair of vibration sensors A and A', and a pair of vibration sensors B and B', because of the following reason. That is, since the vibration transmission plate has anisotropy as described above, the vibration transmission velocity differs between two directions each indicated by a two-headed arrow, so that the relationship between the distance and the vibration transmission time differs, while the distance is calculated by using the mean value of the vibration transmission velocity values of the respective sensors as a constant.

For the purpose of comparison, FIG. 16 illustrates the relationship between the error ΔL and the distance from each of the vibrating sensors calculated under the same conditions as in the case of FIG. 15 in a vibration transmission plate having no anisotropy in which the vibration transmission velocity does not change depending on the direction of transmission of vibration. It can be understood from FIG. 16 that, when no anisotropy is present, no problem arises even if the distance is calculated by using the mean value of the vibration transmission velocity values of the respective sensors as a constant.

SUMMARY OF THE INVENTION

It is an object of the present invention to solve the above-described problems.

According to a first aspect, the present invention provides a coordinate determining apparatus. The apparatus includes a vibration transmission plate having anisotropic properties such that vibrations from a vibration generation source applied to the vibration transmission plate propagate through the vibration transmission plate with differing vibration transmission velocities depending on a direction of transmission of vibration. The apparatus further includes a plurality of vibration detection means for detecting vibrations transmitted through the vibration transmission plate, and determination means for determining coordinates of the vibration generation source by measuring time periods of propagation of vibrations through the vibration transmission plate from the vibration generation source to one or more of the vibration detection means. Further, the vibration transmission plate and the plurality of vibration detection means are provided such that bisectors of angles made by two line segments each connecting two opposing vibration detection means from among the plurality of vibration detection means coincide with axes of anisotropy of the vibration transmission plate.

According to a second aspect, the present invention provides a method for controlling a coordinate determining apparatus. The method includes the step of providing a vibration transmission plate having anisotropic properties such that vibrations from a vibration generation source applied to the vibration transmission plate propagate through the vibration transmission plate with differing vibration transmission velocities depending on a direction of transmission of vibration. The method further includes the steps of providing a plurality of vibration detection means for detecting vibrations transmitted through the vibration transmission plate, and determining coordinates of the vibration generation source by measuring time periods of propagation of vibrations through the vibration transmission plate from the vibration generation source to one or more of a plurality of vibration detection means. The vibration transmission plate and the plurality of vibration detection means are provided such that bisectors of angles made by two line segments each connecting two opposing vibration detection means from among the plurality of vibration detection means coincide with axes of anisotropy of the vibration transmission plate.

In yet another aspect, the present invention provides a coordinate determining apparatus. The apparatus includes a vibration transmission plate having anisotropic properties such that vibrations from a vibration generation source applied to the vibration transmission plate propagate through the vibration transmission plate with differing vibration transmission velocities depending on a direction of transmission of vibration. The apparatus further includes a plurality of vibration detection means for detecting the vibrations transmitted through the vibration transmission plate. The plurality of vibration detection means are arranged at opposing corners of the vibration transmission plate such that bisectors of angles made by two line segments each connecting two opposing vibration detection means coincide with axes of anisotropy of the vibration transmission plate. The apparatus also includes determination means for determining coordinates of the vibration generation source by measuring time periods of propagation of vibrations through the vibration transmission plate from the vibration generation source to the vibration detection means.

In another aspect, the present invention provides a method for controlling a coordinate determining apparatus. The method includes the step of providing a vibration transmission plate having anisotropic properties such that vibrations from a vibration generation source applied to the vibration transmission plate propagate through the vibration transmission plate with differing vibration transmission velocities depending on a direction of transmission of vibration. The method further provides a plurality of vibration detection means for detecting vibrations transmitted through the vibration transmission plate. The plurality of vibration detection means are arranged at opposing corners of the vibration transmission plate such that bisectors of angles made by two line segments each connecting two opposing vibration detection means coincide with axes of anisotropy of the vibration transmission plate. The method further includes the step of determining coordinates of the vibration generation source by measuring a time period of propagation of the vibrations through the vibration transmission plate from the vibration generation source to the vibration detection means.

In another aspect, the present invention provides a coordinate determining apparatus having a vibration transmission plate having anisotropic properties such that vibrations from a vibration generation source applied to the vibration transmission plate propagate through the vibration transmission plate with differing vibration transmission velocities depending on a direction of transmission of vibration. The apparatus includes a plurality of vibration detection means for detecting the vibration transmitted through the vibration transmission plate, the plurality of vibration detection means being arranged at opposing sides of the vibration transmission plate such that bisectors of angles made by two line segments each connecting two opposing vibration detection means coincide with axes of anisotropy of the vibration transmission plate. The apparatus further includes determination means for determining coordinates of the vibration generation source by measuring time periods of propagation of vibrations through the vibration transmission plate from the vibration generation source to the vibration detection means.

In yet another aspect, the present invention includes a method for controlling a coordinate determining apparatus including the step of providing a vibration transmission plate having anisotropic properties such that vibrations from a vibration generation source applied to the vibration transmission plate propagate through the vibration transmission plate with differing vibration transmission velocities depending on a direction of transmission of vibration. The method further includes the step of providing a plurality of vibration detection means for detecting vibrations transmitted through the vibration transmission plate, the plurality of vibration detection means being arranged at opposing sides of the vibration transmission plate such that bisectors of angles made by two line segments each connecting two opposing vibration detection means coincide with axes of anisotropy of the vibration transmission plate. The method also provides the step of determining coordinates of the vibration generation source by measuring a time period of propagation of the vibrations through the vibration transmission plate from the vibration generation source to the vibration detection means.

The foregoing and other objects, advantages and features of the present invention will become more apparent from the following description of the preferred embodiments taken in conjunction with the accompanying drawings.

DESCRIPTION OF THE PREFERRED EMBODIMENTS

First Embodiment

A first embodiment of the present invention will now be described in detail with reference to the drawings.

Figure 1:
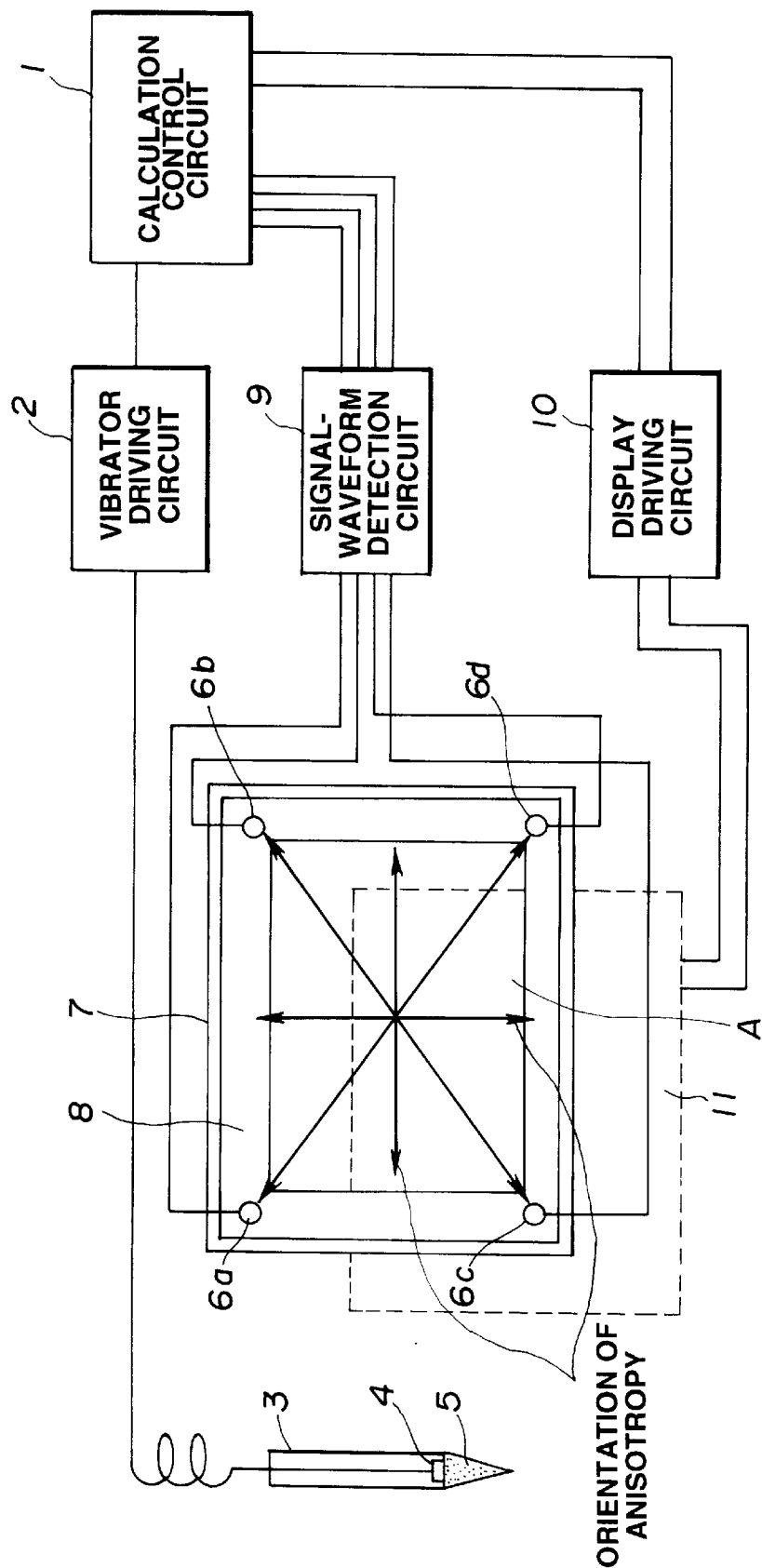
FIG. 1 is a diagram which most clearly shows features of the configuration of a coordinate input apparatus according to a first embodiment of the present invention.

FIG. 1 is a diagram which most clearly shows features of the configuration of a coordinate input apparatus according to the first embodiment. In FIG. 1, a calculation control circuit 1 controls the entire apparatus and calculates a coordinate position. A vibrator driving circuit 2 causes the tip of a vibrating pen 3 to vibrate. A vibration transmission plate 8 comprises a transparent member, such as an acrylic-resin plate, a glass plate or the like. Input of coordinates by the vibrating pen 3 is performed by touching the surface of the vibration transmission plate 8 with the vibrating pen 3.

A region A indicated by solid lines (hereinafter termed an "effective area") is provided on the vibration transmission plate 8. The effective area A is rectangular as shown in FIG. 1, and only coordinates designated by the vibrating pen 3 within the region A become effective input coordinates. The region A is determined by the specifications of the coordinate input apparatus, such as required accuracy in coordinate input, the range of coordinate input, and the like.

A damping material 7 for preventing (reducing) the return of reflected vibration to a central portion is provided at an external circumference of the vibration transmission plate 8. Four vibration sensors 6a–6d, each comprising a piezoelectric element or the like, for converting mechanical vibration into an electrical signal are fixed at peripheral corner portions outside the effective area A of the vibration transmission plate 8.

The vibration transmission plate 8 of the first embodiment has anisotropy in which the vibration transmission velocity differs depending on the direction of the transmission of vibration. Such anisotropy is present in a metallic plate manufactured through a rolling process, and may also be obtained by bonding a resin sheet having anisotropy on the vibration transmission plate 8. The anisotropy appears in directions orthogonal to each other. The orientation of the vibration transmission plate 8 is adjusted so that orthogonal axes of anisotropy of the vibration transmission plate 8 coincide with bisectors of angles made by two line segments connecting the respective facing vibration sensors 6a and 6d, and 6b and 6c. That is, if, for example, a metallic plate is used, the plate is cut so that the directions of anisotropy coincide with the directions of the bisectors. When bonding a resin sheet on a glass plate, bonding is performed by adjusting the directions of the bisectors with the directions of anisotropy of the resin sheet. The anisotropy of the vibration transmission plate and the arrangement of the vibration sensors of the first embodiment will be described in detail later.

Output signals from the vibration sensors 6a–6d are transmitted to respective preamplifiers (not shown) provided in the vicinity of the corresponding vibration sensors 6a–6d, and the signals amplified with a predetermined gain in the preamplifiers are transmitted to a signal-waveform detection circuit 9. Signals from the signal-waveform detection circuit 9 corresponding to the respective vibration sensors 6a–6d are transmitted to the calculation control circuit 1 which performs coordinate calculation.

Reference numeral 11 represents a display capable of performing display in units of a dot, such as a liquid-crystal display, a liquid-crystal projection-type display or the like, a CRT (cathode-ray tube), a CRT projection-type display, or the like, which is provided behind the vibration transmission plate 8 when the vibration transmission plate 8 is transparent. By being driven by a display driving circuit 10, the display 11 can display a position traced by the vibrating pen 3 which can be seen through the vibration transmission plate 8.

Figure 2:
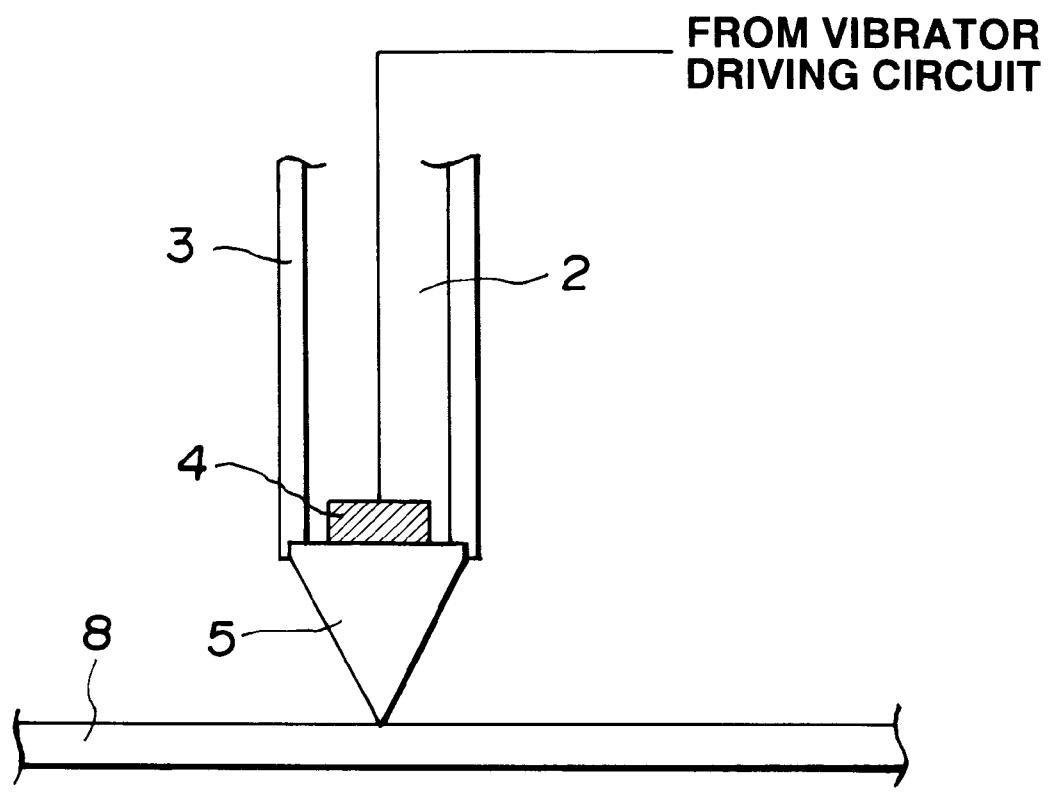
FIG. 2 is a diagram illustrating the configuration of a vibrating pen.

As shown in FIG. 2, a vibrator 4 incorporated in the vibrating pen 3 is driven by the vibrator driving circuit 2 also incorporated in the vibrating pen 3. A driving signal for the vibrator 4 is supplied from the calculation control circuit 1 as a low-level pulse signal, and is applied to the vibrator 4 after being amplified by the vibrator driving circuit 2 with a predetermined gain.

The electrical driving signal is converted into a mechanical ultrasonic vibration by the vibrator 4, and the obtained vibration is transmitted to the vibration transmission plate 8 via a pen tip 5.

The vibration frequency of the vibrator 4 is selected so as to be able to generate a Lamb wave in the vibration transmission plate 8 made of glass or the like. When driving the vibrator 4, a mode of vibrating in a direction perpendicular to the plane of FIG. 2 in the vibration transmission plate 8 is selected. By setting the vibration frequency of the vibrator 4 to a resonance frequency including the pen tip 5, efficient vibration conversion can be performed.

As described above, the elastic wave transmitted to the vibration transmission plate 8 is a Lamb wave, which has the feature that it is less influenced by a scratch, an obstacle or the like on the surface of the vibration transmission plate 8 compared with a surface wave or the like.

Explanation of the calculation control circuit 1

In the above-described configuration, the calculation control circuit 1 causes the vibration driving circuit 2 to output a signal for driving the vibrator 4 within the vibrating pen 3 at a predetermined period (for example, 5 ms), and starts time counting by an incorporated timer (configured by a counter). The vibration generated by the vibrating pen 3 reaches the vibration sensors 6a–6d by being delayed in proportion to the respective distances to the sensors 6a–6d.

The signal-waveform detection circuit 9 detects signals from the vibration sensors 6a–6d, and generates signals indicating vibration arrival timings to the respective sensors according to waveform detection processing (to be described later). The calculation control circuit 1 receives the signals from the vibration sensors 6a–6d, detects vibration arrival time periods to the respective sensors 6a–6d, and calculates the coordinate position of the vibrating pen 3.

The calculation control circuit 1 also controls display by the display device 11 by driving the display driving circuit 10 based on the calculated position information of the vibrating pen 3, or outputs the coordinate information to an external apparatus (not shown) according to serial-parallel communication.

Figure 3:
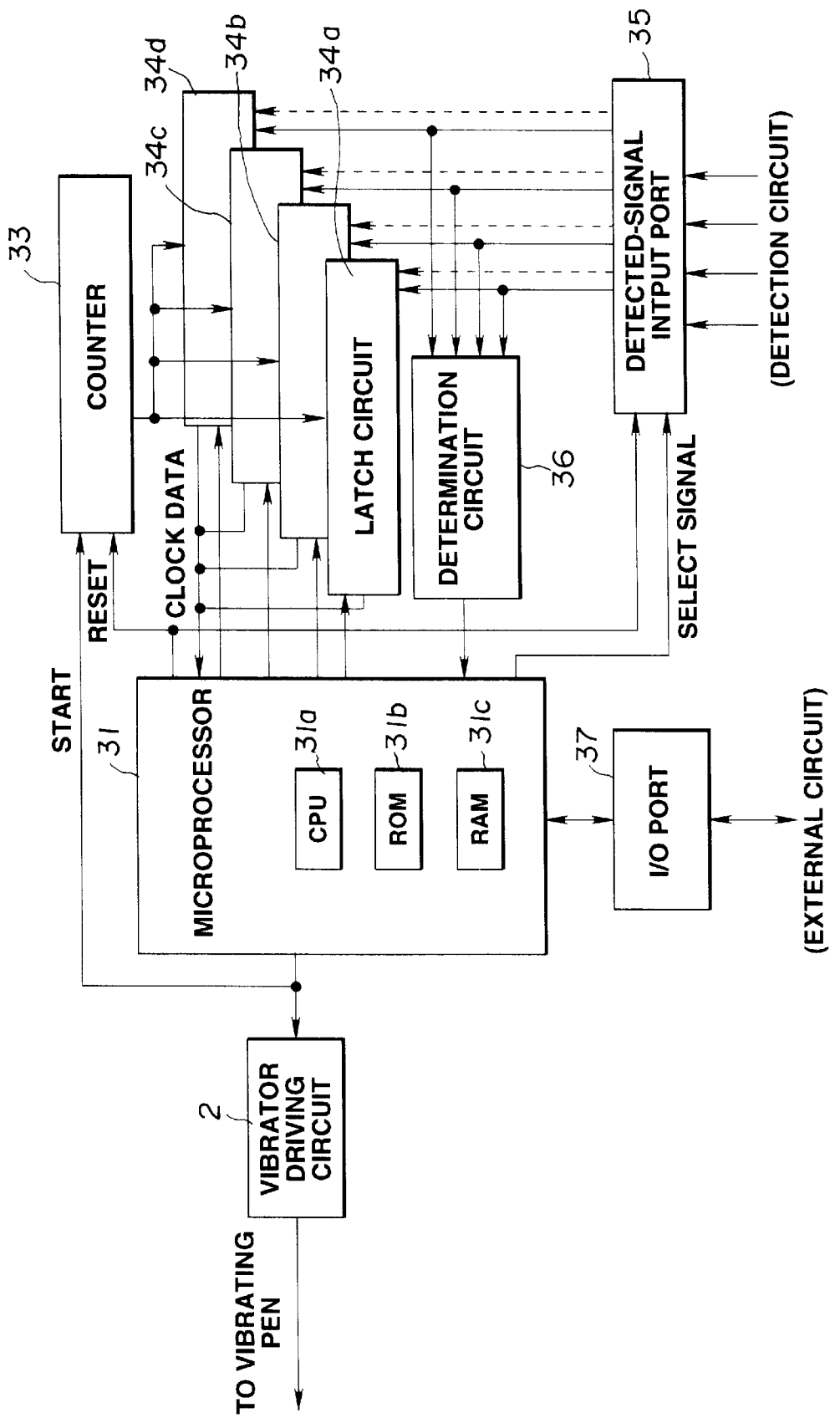
FIG. 3 is a block diagram illustrating the internal configuration of a calculation control circuit shown in FIG. 1.
Figure 4:
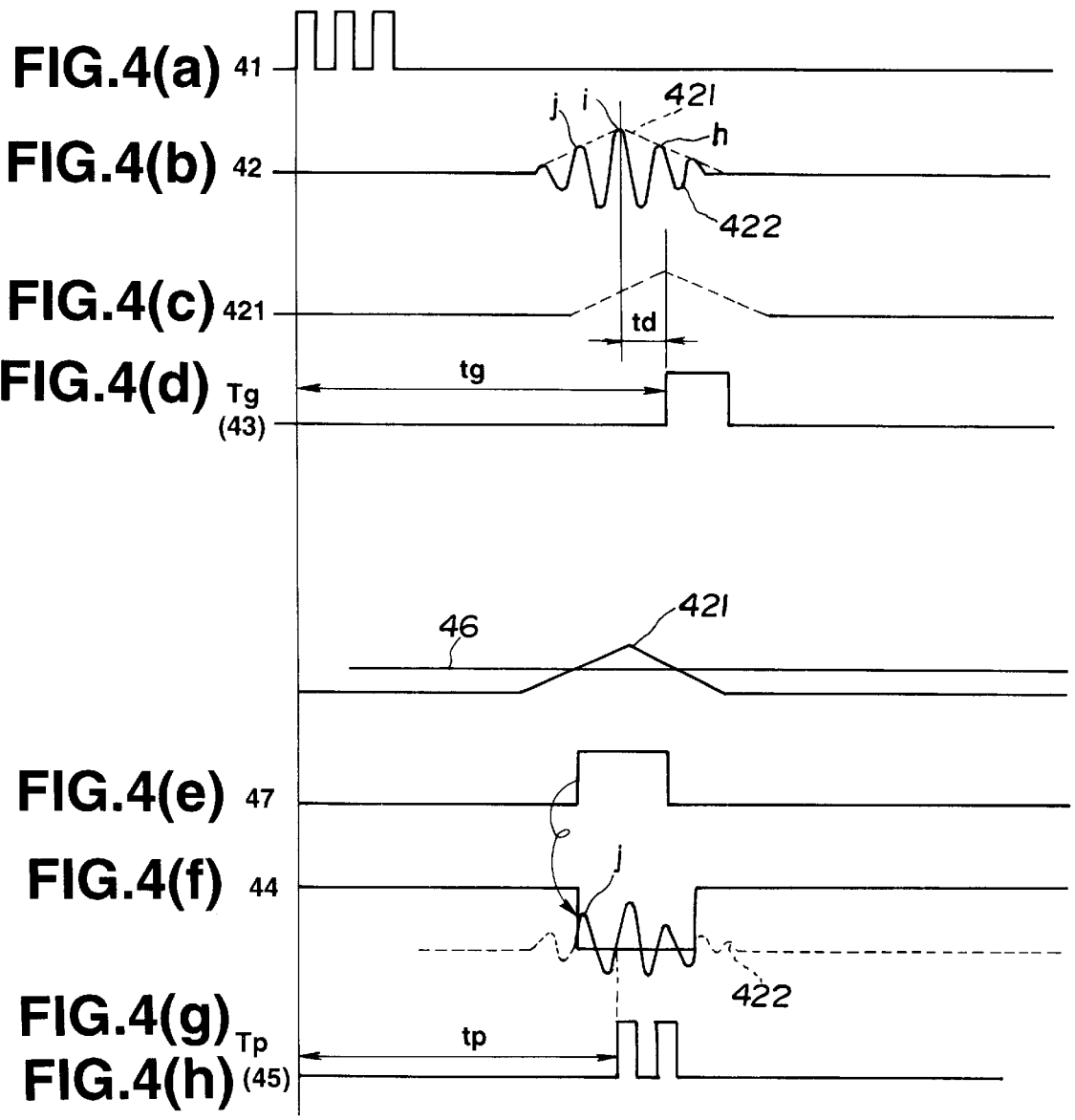
FIGS. 4(a)–4(h) are time charts of signal processing.

FIG. 3 is a schematic block diagram illustrating the configuration of the calculation control circuit 1. A description will now be provided of respective components and an outline of the operations of the components.

In FIG. 3, a microprocessor 31 controls the calculation control circuit 1 and the entire coordinate input apparatus, and includes a ROM (read-only memory) 31b storing operation procedures and various kinds of constants (including the vibration transmission velocity), a working memory RAM (random access memory) 31c used for calculation and the like, a CPU (central processing unit) 31a for executing calculation/control using the ROM 31b and the RAM 31c, and the like.

A timer (configured by a counter or the like) 33 counts reference clock pulses (not shown), and starts its counting when a start signal for causing the vibrator driving circuit 2 to start the driving of the vibrator 4 within the vibrating pen 3 is input. Thus, the start of counting and the detection of the vibration by the sensors are synchronized, and delay times until the vibration is detected by the vibration sensors 6a–6d can be detected.

Other circuits constituting the calculation control circuit 1 will now be individually described.

Vibration arrival timing signals from the respective vibration sensors 6a–6d output from the signal-waveform detection circuit 9 are input to latch circuits 34a–34d, respectively, via a detection-signal input port 35.

The latch circuits 34a–34d correspond to the vibration sensors 6a–6d, respectively. Upon reception of a timing signal from the corresponding sensor, each of the latch circuits 34a–34d latches a count value of the timer 33 at that time. When a determination circuit 36 determines that detection signals from all of the vibration sensors 6a–6d have been received, it outputs a signal indicating the fact to the microprocessor 31.

Then, the microcomputer 31 outputs a select signal, serving as a determination switching signal to the determination circuit 36.

Upon reception of the signal from the determination circuit 36, the microprocessor 31 reads from the latch circuits 34a–34d vibration transmission time periods to the respective vibration sensors, and calculates the coordinate position of the vibrating pen 3 on the vibration transmission plate 8 by performing a predetermined calculation.

By outputting the calculated coordinate-position information to the display driving circuit 10 via an I/O port 37, the microprocessor 31 can display a dot or the like at the corresponding position on the display 11. Alternatively, by outputting the coordinate-position information to an interface circuit via the I/O port 37, the microprocessor 31 can output the coordinate value to an external apparatus.

Figure 13:
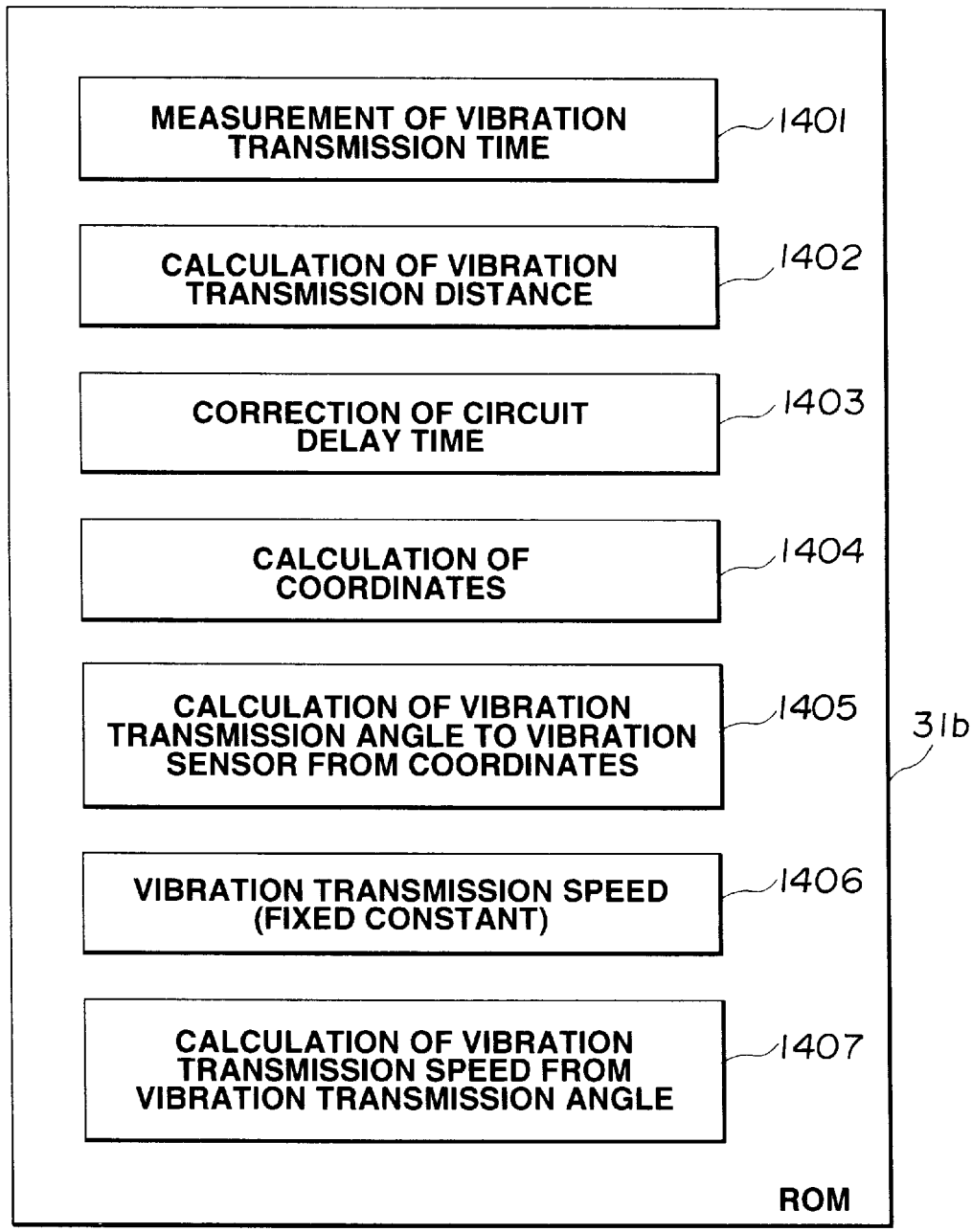
FIG. 13 is a schematic diagram illustrating program codes and constants stored in a ROM (read-only memory) within a microprocessor in the present invention.
Figure 15:
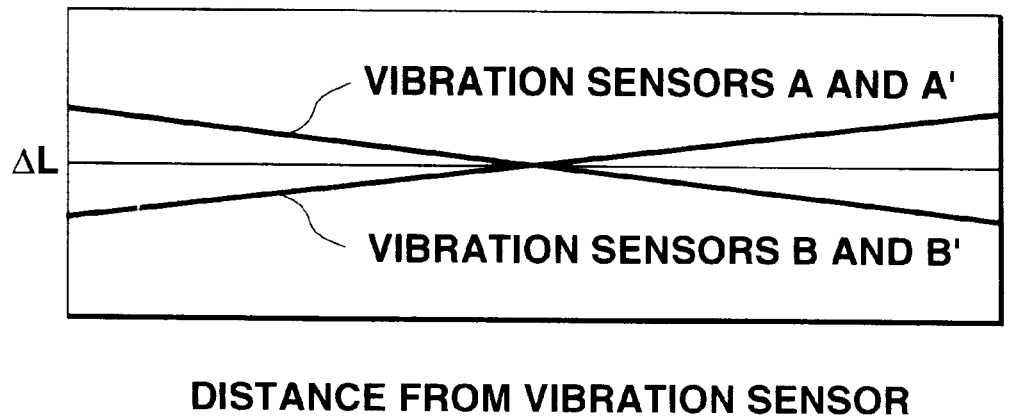
Figure 16:
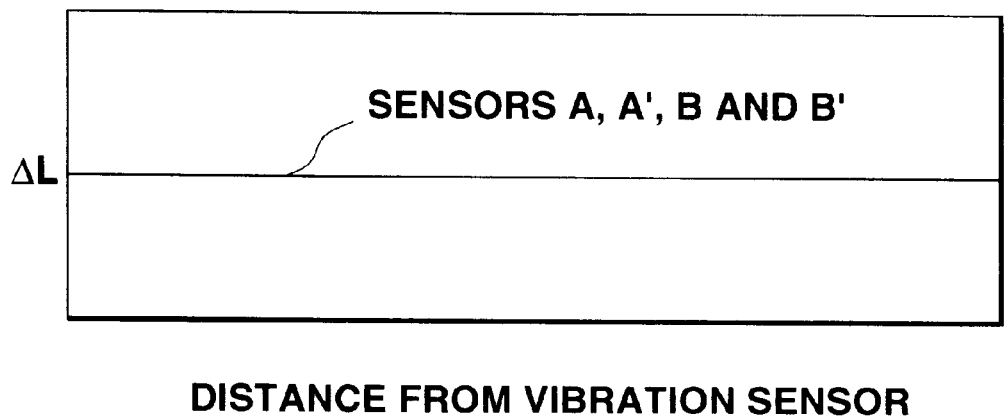

FIG. 13 is a schematic diagram illustrating program codes and constants stored in the ROM 31b within the microprocessor 31. A program module 1401 drives the vibrating pen 3 via the vibrator driving circuit 2 in the above-described manner, and measures the time period until the vibration is detected by each of the vibration sensors 6a–6d, i.e., the vibration transmission time. A program module 1402 calculates the distance from the vibrating pen 3 to each of the vibration sensor 6 from the measured vibration transmission time, and the vibration transmission velocity held in a region 1405 as a constant. A program module 1403 corrects the calculated distance. A program module 1404 calculates the input coordinates of the vibration from the calculated and corrected distances.

Explanation of the detection of the vibration transmission time (FIGS. 4(a)–4(h) and 5)

The principle of measuring the vibration transmission time to each of the vibration sensors 6a–6d will now be described.

The measurement of the vibration transmission time is executed based on the program module 1401, and the calculation of the vibration transmission distance is executed based on the program module 1402. FIGS. 4(a)–4(d) are diagrams illustrating a detected waveform input to the signal-waveform detection circuit 9, and processing of measuring the vibration transmission time from the detected waveform. Although a description will be provided illustrating the vibration sensor 6a, the situation is the same for the other sensors 6b–6d.

As described above, the measurement of the vibration transmission time to the vibration sensor 6a is started simultaneously with the output of a start signal to the vibrator driving circuit 2. At that time, a driving signal 41 is applied from the vibrator driving circuit 2 to the vibrator 4. Ultrasonic vibration transmitted from the vibrating pen 3 to the vibration transmission plate 8 by this signal 41 is detected by the vibration sensor 6a after proceeding during a time period tg corresponding to the distance to the vibration sensor 6a. Reference numeral 42 represents a signal waveform detected by the vibration sensor 6a.

Since the vibration used in the first embodiment is a Lamb wave, the envelope 421 and the phase 422 of the detected waveform change depending on the transmission distance within the vibration transmission plate 8. The velocity of the envelope 421, i.e., the group velocity is represented by Vg, and the phase velocity of the phase 422 is represented by Vp. The distance between the vibrating pen 3 and the vibration sensor 6a can be derived from the group velocity Vg and the phase velocity Vp.

If attention is payed only to the envelope 421, its velocity is Vg. By detecting a specific point, such as a point of inflection or a peak of a signal 43 shown in FIG. 4(d), on the wave, the distance d between the vibrating pen 3 and the vibration sensor 6a is given by:

$$d = Vg \cdot tg \qquad (1),$$

where tg is the vibration transmission time. Although this expression relates to the vibration sensor 6a, the distance between each of the three other vibration sensors 6b–6d and the vibrating pen 3 can be expressed by the same expression.

In order to more precisely determine the coordinates, processing based on the detection of a phase signal is performed.

If a time period from the application of the vibration to a specific detected point in a signal 45, for example, a zero-crossing point after a specific signal level 46, is represented by tp (obtained by generating a window signal 44 having a predetermined width for a signal 47 and comparing the signal 44 with the phase signal 422), the distance d between the vibration sensor and the vibrating pen is given by:

$$d = n \cdot \lambda p + Vp \cdot tp \qquad (2),$$

where λp is the wavelength of the elastic wave, and n is an integer.

The integer n is given from the expressions (1) and (2) by:

$$n[(Vg \cdot tg - Vp \cdot tp)/\lambda p + 1/N] \qquad (3).$$

In this expression, N is a real number other than "0", and can have an appropriate value. If, for example, N=2, the value n can be determined if, for example, variations in tg are within ±½ wavelength. By substituting the obtained value of n in expression (2), the distance between the vibrating pen 3 and the vibration sensor 6a can be precisely measured. The signals 43 and 45 for measuring the two vibration transmission times tg and tp are generated by the signal-waveform detection circuit 9, which is configured as shown in FIG. 5.

Figure 5:
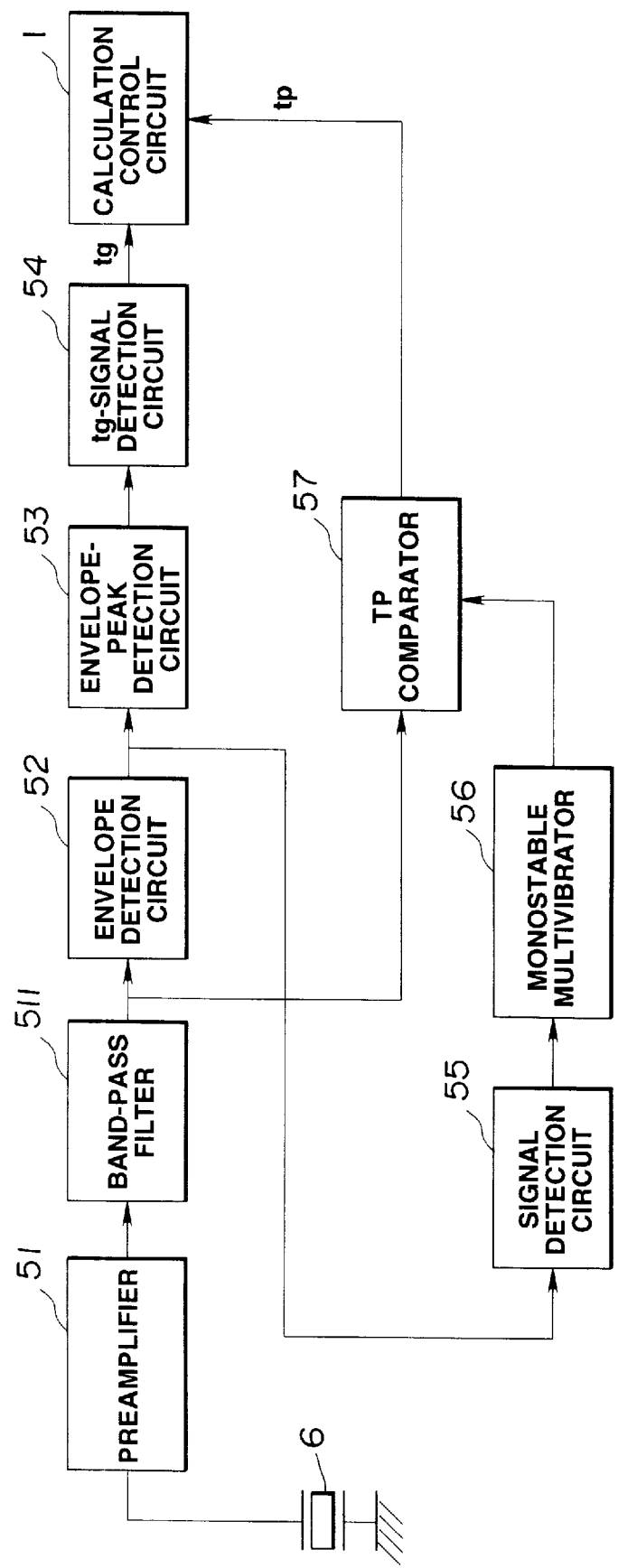
FIG. 5 is block diagram of a signal-waveform detection circuit shown in FIG. 1.

FIG. 5 is a block diagram illustrating the configuration of the signal-waveform detection circuit 9 in the first embodiment.

In FIG. 5, the output signal of the vibration sensor 6a is amplified by a preamplifier 51 to a predetermined level. Unnecessary frequency components in the amplified signal are removed by a band-pass filter 511. The resultant signal is input to an envelope detection circuit 52 configured by an absolute-value circuit, a low-pass filter and the like, and only the envelope of the detection signal is taken out. The timing of the peak of the envelope is detected by an envelope-peak detection circuit 53. A tg-signal (the signal 43 shown in FIG. 4(d)), serving as a detection signal of a delay time of an envelope having a predetermined waveform, is formed by a tg-signal detection circuit 54 configured by a monomultivibrator and the like, and is input to the calculation control circuit 1.

A signal detection circuit 55 forms a pulse signal 47 representing a portion exceeding a threshold signal 46 having a predetermined level within the envelope signal 421 detected by the envelope detection circuit 52. A monostable multivibrator 56 opens the gate signal 44 having the predetermined time width triggered by the first rise of the pulse signal 47. A tp comparator 57 detects the zero-crossing point of the first rise of a phase signal 422 while the gate signal 44 opens, and a phase-delay-time signal 45 is supplied to the calculation control circuit 1. The circuitry described above is for the vibration sensor 6a. The same circuitry is provided for each of the other vibration sensors.

Explanation of correction of a circuit delay time

The vibration transmission time latched by the latch circuit includes a circuit delay time et and a phase offset time toff. An error produced by these values is always included as the same amount at the transmission of vibration from the vibrating pen 3 to the vibration sensors 6a–6d via the vibration transmission plate 8.

If the distance from the origin O in FIG. 6 to the vibration sensor 6a is represented by R1(=X/2), the measured vibration transmission times from the origin O to the sensor 6a when inputting vibration from the vibrating pen 3 at the origin O are represented by tgz' and tpz, and the true transmission times from the origin O to the sensor 6a are represented by tgz and tpz, these values are in the following relationship with respect to the circuit delay time et and the phase offset toff:

$$tgz' = tgz + et \qquad (4)$$

$$tpz' = tpz + et + toff \qquad (5).$$

On the other hand, measured values tg' and tp' for an arbitrary input point P are given by:

$$tg' = tg + et \qquad (6)$$

$$tp' = tp + et + toff \qquad (7).$$

The differences between expressions (4) and (6), and (5) and (7) are expressed by:

$$tg' - tgz' = (tg + et) - (tgz + et) = tg - tgz \qquad (8)$$

$$tp' - tpz' = (tp' + et + toff) - (tpz + et + toff) \qquad (9)$$
$$= tp - tpz.$$

That is, the circuit delay time et and the phase offset toff included in the respective transmission times are removed, and the difference between true transmission delay times in proportion to the difference between the distance from the origin O and the input point P to the sensor 6a, and the difference between the two distances can be obtained using the above-described expressions (2) and (3).

Since the distance from the vibration sensor 6a to the origin O is stored in advance in a nonvolatile memory or the like and is therefore known, the distance between the vibrating pen 3 and the vibration sensor 6a can be determined. The same measurement can also be performed for the other sensors 6b–6d.

The measured values tgz' and tpz' for the origin O may be stored in a nonvolatile memory when shipping the apparatus. Calculation according to expressions (8) and (9) is executed before performing calculation using expressions (2) and (3) based on the program module 1403, so that very precise measurement can be performed.

Explanation of anisotropy of the vibration transmission plate, the arrangement of the vibration sensors, and a method for determining a constant in the first embodiment A description will now be provided of anisotropy of the vibration transmission plate, the arrangement of the vibration sensors, and a method for determining a constant which are the principal portions of the first embodiment.

Although described above a little, anisotropy, in which the vibration transmission velocity of the vibration transmission plate differs depending on the direction of the transmission of vibration, appears, when the vibration transmission plate is made of a metal, such as aluminum or the like, due to different vibration transmission conditions depending on the direction of vibration caused by the alignment of the grain boundaries of the metal in the direction of rolling. Anisotropy appears not only in a metal, but also, for example, in a resin sheet depending on the direction of drawing during the production process. By bonding such a resin sheet on the vibration transmission plate, the entire vibration transmission plate has anisotropy. When the resin itself is used as the vibration transmission plate, anisotropy, of course, appears.

In the first embodiment, the apparatus is configured by the vibration transmission plate 8 having anisotropy in which the vibration transmission velocity differs depending on the direction of the transmission of vibration. Materials which are industrially available at present as plate materials have more or less anisotropy because of the above-described reasons in their production process. Particularly, a resin sheet having large anisotropy laminated on a glass plate having small anisotropy for the purpose of preventing dispersion has various applicational fields. On the other hand, if it is intended to use a material having small anisotropy for the vibration transmission plate, a special material is required, thereby increasing the production cost.

Figure 7:
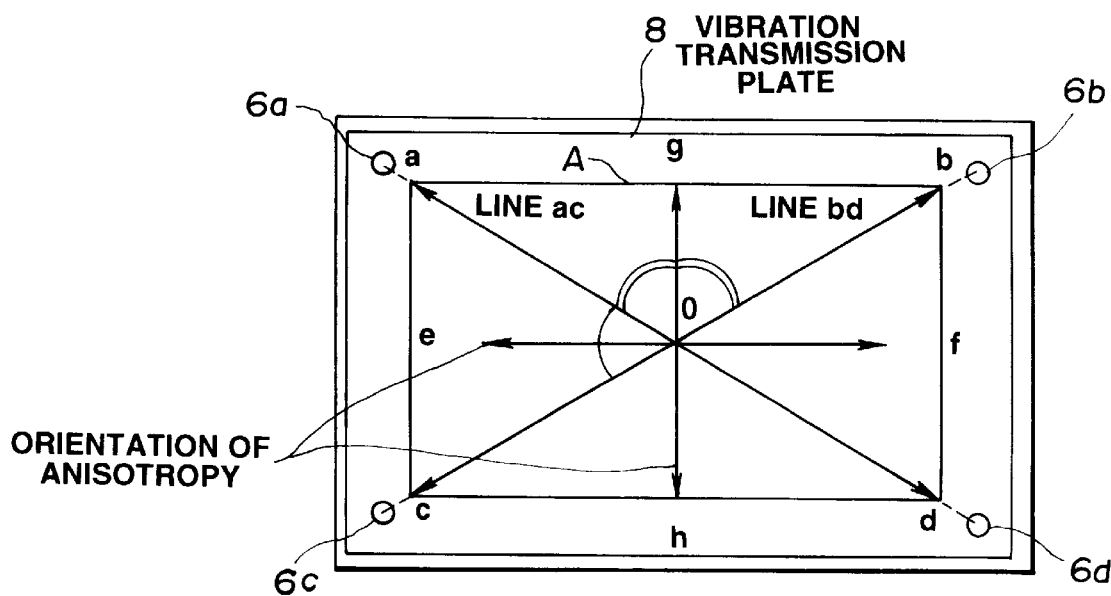
FIGS. 7 and 8 are diagrams illustrating anisotropy of a vibration transmission plate, the arrangement of vibration sensors, and a method for determining a constant in the first embodiment.

As briefly described with reference to FIG. 1, and as shown in FIG. 7, the first embodiment relates to the orientation of anisotropy and the arrangement of vibration sensors when arranging the four vibration sensors 6a–6d at four corners of the rectangular vibration transmission plate 8 having anisotropy.

As described in the "explanation of the detection of the vibration transmission time", in order to calculate the distance between the vibrating pen 3 and each of the vibration sensors 6a–6d, it is necessary to obtain in advance the vibration transmission velocity values i.e., the group velocity Vg and the phase velocity Vp as constants. In the configuration of the first embodiment, even when using a vibration transmission plate having anisotropy, it is only necessary to obtain only one constant as the vibration transmission velocity and to hold the constant in the region 1405 of the ROM 31b. It is unnecessary to have different constants for respective vibration sensors as in the conventional approach. This operation will now be described.

As described above, consider the vibration transmission plate 8 having the four vibration sensors 6a–6d disposed on four corners thereof. Two line segments connecting the facing vibration sensors 6a and 6d, and 6b and 6c are represented by lines ad and bc, lines indicating the orientations of anisotropy of the vibration transmission plate 8 are represented by lines ef and gh, and the cross point of these lines is represented by o. The direction of the vibration transmission plate 8 is adjusted so that the lines ef and gh, serving as the axes of anisotropy, coincide with the bisectors of angles made by the lines ad and bc, for example, ∠aoc and ∠aob. That is, the vibration transmission plate 8 is adjusted so that:

∠aoe=∠coe, and ∠aog=∠bog.

In the first embodiment, the directions of the transmission of vibration of the vibration transmission velocity provided in advance as a constant for calculating distances coincide with the directions of line segments connecting respective pairs of facing vibration sensors (6a and 6d, and 6b and 6c). In practice, the vibration transmission velocity may be obtained by scanning the vibration transmission plate 8 with the vibrating pen 3 using an XY stage, and measuring the distance from the vibrating pen 3 to the vibration sensor 6, and the vibration transmission time, or by any other method. The obtained vibration transmission velocity is equal for the respective vibration sensors. That is, the vibration transmission velocity is equal in the directions of the lines ad and bc. This is because the lines ef and gh, serving as the axes of anisotropy, coincide with the bisectors of the angles made by the lines ad and bc, and the lines ad and bc make the same angle with the lines ef and gh, serving as the axes of anisotropy, thereby providing the same vibration transmission characteristics. Accordingly, it is only necessary to hold the vibration transmission velocity for one vibration sensor in the region 1405 of the ROM 31b as a constant to be held within the coordinate input apparatus of the invention. Accordingly, the coordinate input apparatus of the first embodiment can greatly simplify the process for measuring the vibration transmission velocity in industrialization, and to lessen the burden on storage means for holding the constant and distance calculation means of the apparatus.

Figure 8:
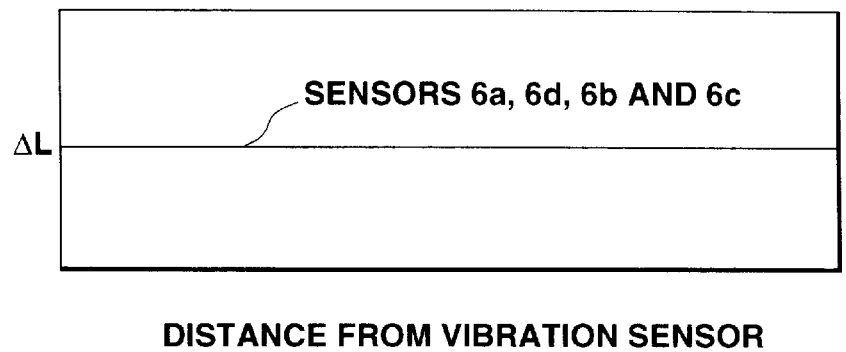
Figure 9:
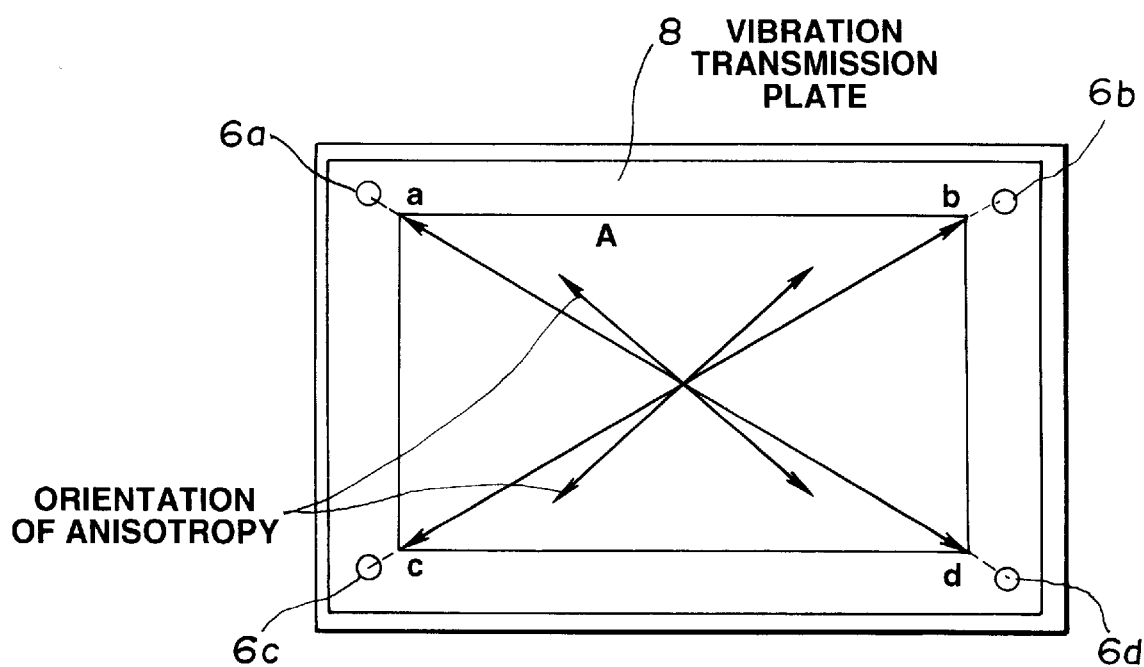
FIGS. 9 and 10 are diagrams also illustrating anisotropy of a vibration transmission plate, the arrangement of vibration sensors, and a method for determining a constant in the first embodiment.
Figure 10:
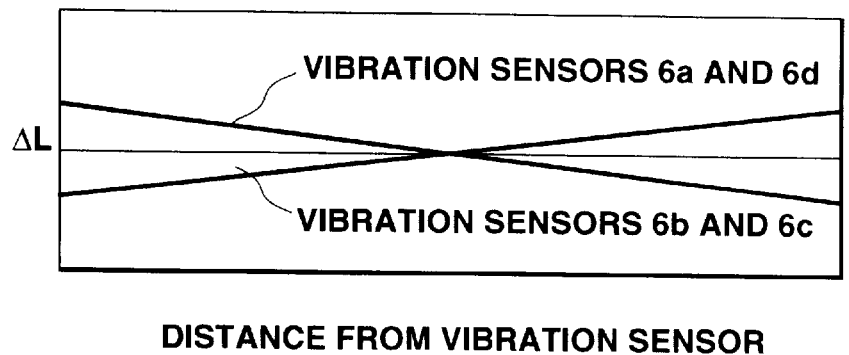

FIG. 8 is a graph illustrating the error ΔL in the first embodiment wherein the vibration transmission plate and the vibration sensors are arranged so that the bisectors of angles made by two line segments connecting two pairs of facing vibration sensors coincide with the axes (directions) of anisotropy of the vibration transmission plate, and errors are calculated by using the vibration transmission velocity in a direction connecting facing two vibration sensors as a constant (the ordinate representing the error ΔL in the distance from each sensor to the vibrating pen obtained from the delay time, and the abscissa representing the distance from each vibration sensor). For the purpose of comparison, FIG. 10 is a graph illustrating the error ΔL in an arrangement of vibration sensors different from that of the present invention, wherein, as shown in FIG. 9, the vibration transmission plate and the vibration sensors are arranged so that the directions connecting two pairs of facing vibration sensors slightly differ from the axes of anisotropy of the vibration transmission plate, the vibration transmission velocity in each of the directions connecting the pairs of facing vibration sensors is measured with each of the four vibration sensors (the same value is obtained for two facing vibration sensors), and the mean value of the measured values is used as a constant. As is apparent from FIGS. 8 and 10, errors are smaller when calculating the distance according to the method of the first embodiment. The same result as in the first embodiment may, of course, be obtained if calculation is performed by using four vibration transmission velocity values for respective sensors. However, as described above, in the first embodiment, it is only necessary to measure the vibration transmission velocity for one vibration sensor 6, and the method of the first embodiment is superior to the conventional method in which it is necessary to measure the vibration transmission velocity values for all of the four vibration sensors, from the viewpoint of industrialization.

Furthermore, paying attention to the fact that, in general, the anisotropy of the vibration transmission plate is identical in the same production lot, and using also the conventional approach of utilizing the fact that the transmission velocity of a Lamb wave depends on the thickness of the plate and the frequency, a relational formula among the detected value of the frequency, the measured value of the thickness of the plate, and the vibration transmission velocity in a direction connecting two facing vibration sensors may be formed in advance, and the vibration transmission velocity of each vibration transmission plate may be calculated using the vibration transmission velocity as a constant after measuring only the thickness of the plate.

In the arrangement of the vibration sensors in the first embodiment, the areas of line segments connecting respective pairs of vibration sensors (6a and 6d, and 6b and 6c), serving as regions for measuring the constant, include the corners of the above-described effective area A, i.e., the positions of farthest distances from the vibration sensors 6a–6d. Namely, the method of the first embodiment uses the vibration transmission velocity at a region which provides the maximum error in the calculation of the distance as a constant, and the error in the calculation of coordinates can be reduced.

Figure 6:
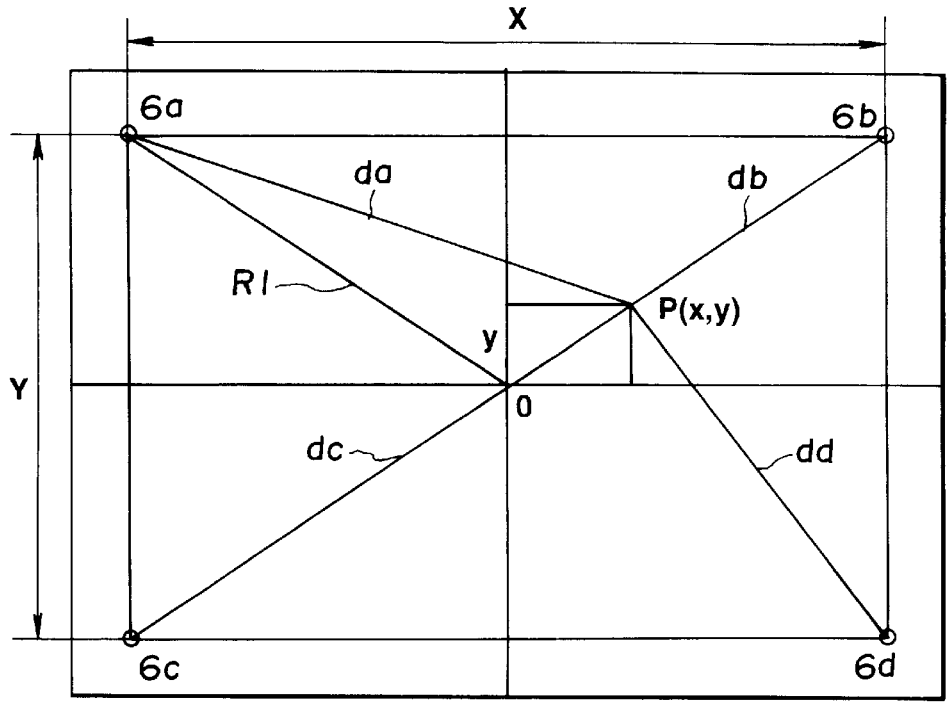
FIG. 6 is a diagram illustrating the principle of calculation of a coordinate position.

Explanation of the calculation of a coordinate position (FIG. 6)

Next, a description will be provided of the principle of the detection of a coordinate position on the vibration transmission plate 8 by the vibrating pen 3 with reference to FIG. 6.

Formulas for calculating coordinates are derived from the theorem of three squares.

If the vibration sensors 6a, 6b and 6c are provided at the positions shown in FIG. 1, the distances da, db and dc from the position P of the vibrating pen 3 to the positions of the vibration sensors 6a, 6b and 6c, respectively, can be obtained according to the above-described principle. The calculation control circuit 1 can obtain the coordinates (x,y) of the point P of the vibrating pen 3 shown in FIG. 6 according to the following expressions using the distances da, db and dc:

$$x = X/2 + (da+db) \cdot (da-db)/2X \quad (10)$$

$$y = Y/2 + (da+dc) \cdot (da-dc)/2Y \quad (11),$$

where X and Y are the distances between the vibration sensors 6a and 6b, and between the vibration sensors 6a and 6c, respectively.

The coordinates of the position of the vibrating pen 3 can be detected in a real time in the above-described manner.

Second Embodiment

Figure 11:
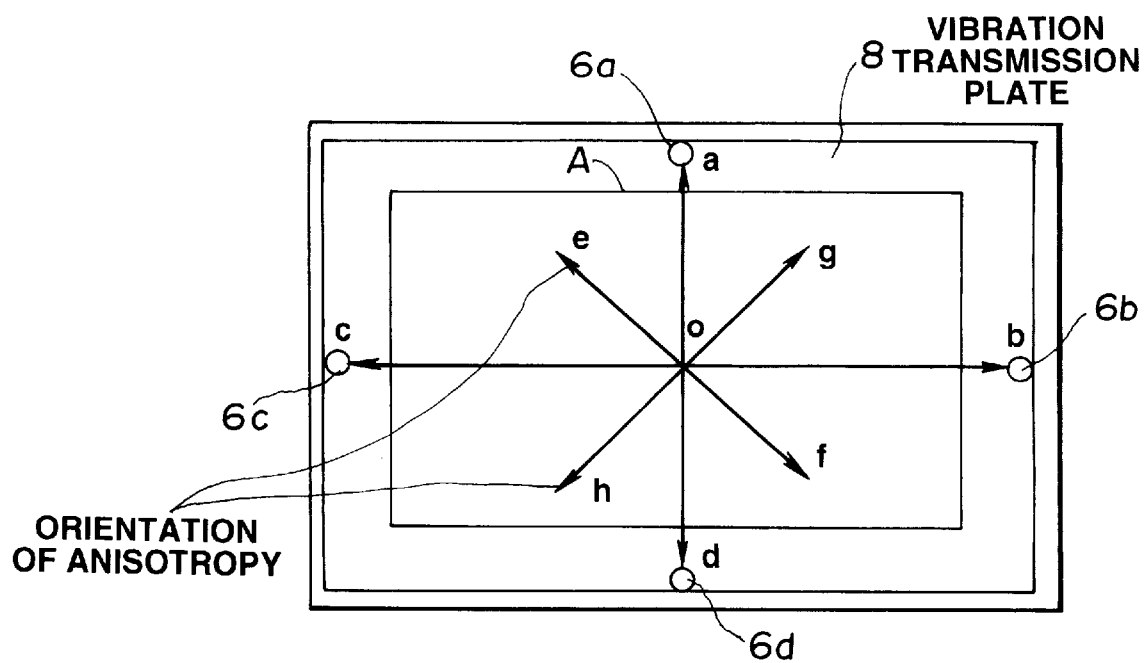
FIG. 11 is a diagram illustrating a second embodiment of the present invention.

The arrangement of the vibration sensors in the present invention is not limited to the case of arranging the sensors at four corners of the vibration transmission plate 8. For example, FIG. 11 illustrates a case in which the vibration sensors are arranged not at the four corners, but are arranged in the form of a cross with respect to the vibration transmission plate and the effective area. In this case, also, the direction of the vibration transmission plate is adjusted so that, if, as shown in FIG. 11, two line segments connecting facing sensors 6a and 6d, 6b and 6c are represented by lines ad and bc, respectively, lines indicating the orientations of anisotropy of the vibration transmission plate are represented by lines ef and gh, and the cross point of these lines is represented by o, the lines ef and gh, serving as the axes of anisotropy, coincide with the bisectors of angles made by the lines ad and bc, for example, ∠aoc and ∠aob, i.e., ∠aoe=∠coe, and ∠aog=∠bog.

In this case, since the lines ef and gh are orthogonal to each other, ∠aoe=∠coe=∠aog=∠bog=45°.

In the above-described configuration, the vibration transmission velocity is equal in the directions of the lines ad and bc, and the vibration transmission velocity for one vibration sensor is held in the region 1405 of the ROM 31b as a constant to be held in the coordinate input apparatus of the present invention.

In this configuration, in addition to the effects of simplifying the process of measuring the vibration transmission velocity and reducing the burden on storage means in industrialization, since the direction of the vibration transmission velocity held as a constant makes an angle of 45° with the axes of anisotropy as described above, the measured vibration transmission velocity has substantially an intermediate value in the width of variations of the vibration transmission velocity due to anisotropy, so that variations of values calculated using the measured velocity value as a constant in the effetive area A can be minimized.

A description has been provided of the configuration of adjusting the orientation of anisotropy of the vibration transmission plate with the arrangement of the vibration sensors, because, in order to calculate coordinates in the effective area, it can be easily realized industrially to provide the vibration sensors at known positions and to make the positions fixed values. However, the arrangment of the vibration sensors may also be ajusted with the orientation of anisotropy of the vibration transmission plate as described above.

Third Embodiment

Figure 12:
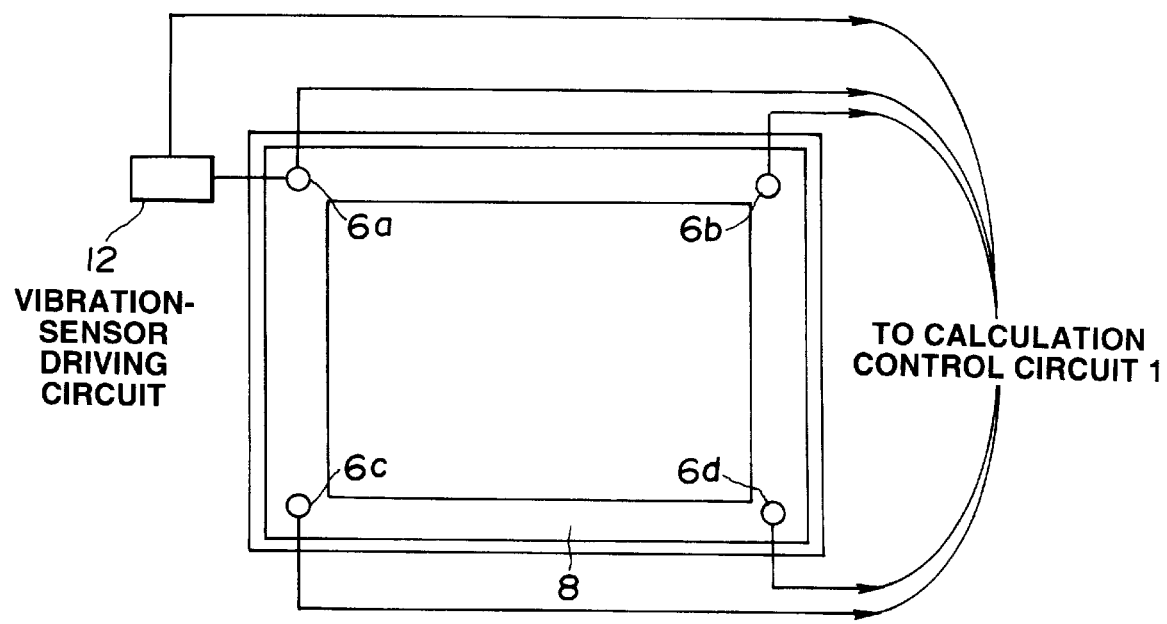
FIG. 12 is a diagram illustrating a third embodiment of the present invention.
Figure 14:
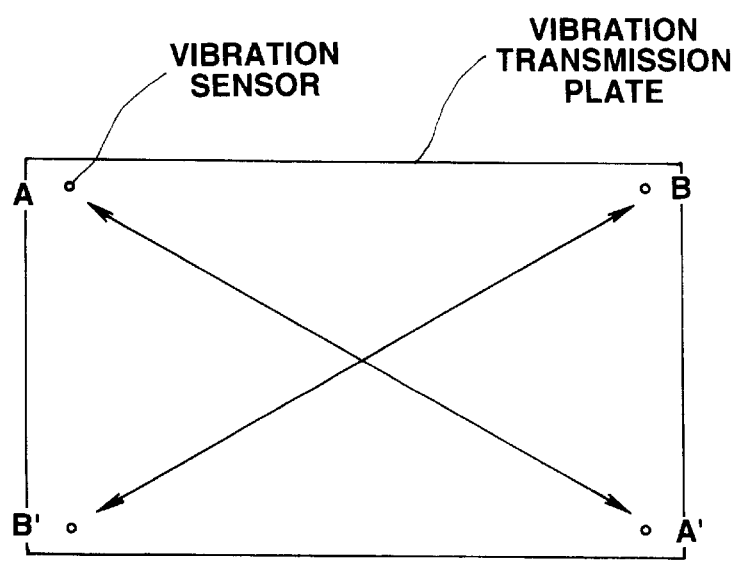
FIGS. 14 through 16 are diagrams illustrating a conventional approach.

In the first embodiment, in order to provide the vibration transmission velocity as a constant, the direction of a line segment connecting a pair of diagonally positioned vibration sensors (6a and 6d, or 6b and 6c) is derived by measuring the distance and the vibration transmission time from the vibrating pen 3 to the vibration sensor 6 by scanning the vibration transmission plate 8 with the vibrating pen 3. However, as shown in FIG. 12, one of the four vibration sensors may be provided with a vibration-sensor driving circuit 12 or the like to provide the function of generating and receiving vibration. Vibration generated by the one of the vibration sensors may be detected by another diagonally positioned vibration sensor, and the vibration transmission velocity may be calculated based on the known distance between the diagonally positioned vibration sensors.

According to the above-described configuration, industrialization can be realized without having large measuring equipment. Furthermore, if the above-described measurement is also performed when using the apparatus, it is possible to easily provide the vibration transmission velocity as a constant even if the environment of the use changes or a component is replaced, and to maintain very precise coordinate detection.

The present invention may be applied to a system comprising a plurality of apparatuses, or to an apparatus comprising only a single unit. The object of the present invention may, of course, be achieved in a case in which, in addition to the above-described arrangement of the vibration sensors, the system or the apparatus is supplied with a storage medium storing program codes of software for realizing the function of the invention, and the program codes stored in the storage medium are read and executed by a computer (or a CPU or a MPU (micropressing unit)) incorporated in the system or the apparatus.

In this case, the program codes read from the storage medium themselves realize the novel function of the invention together with the above-described arrangement of the vibration sensors, and the storage medium storing the program codes realizes the present invention.

As described above, in the present invention, according to the configuration that the vibration transmission plate and the vibration sensors are arranged so that the bisectors of angles made by two line segments each connecting two facing vibration sensors from among a plurality of vibration sensors coincide with the axes of anisotropy of the vibration transmission plate, it is possible to hold the vibration transmission velocity detected by one of the vibration sensors as a constant to be held in the coordinate input apparatus of the invention. As a result, the coordinate input apparatus of the present invention can greatly simplify the process for measuring the vibration transmission velocity, to lessen the burden on storage means for holding the constant and distance calculation means of the apparatus, and to perform very precise coordinate detection.

The individual components shown in outline or designated by blocks in the drawings are all well-known in the coordinate input apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A coordinate determining apparatus, comprising:

a vibration transmission plate having anisotropic properties such that vibrations from a vibration generation source applied to said vibration transmission plate propagate through said vibration transmission plate with differing vibration transmission velocities depending on a direction of transmission of vibration;

a plurality of vibration detection means for detecting vibrations transmitted through said vibration transmission plate; and determination means for determining coordinates of the vibration generation source by measuring time periods of propagation of vibrations through said vibration transmission plate from the vibration generation source to one or more of said vibration detection means, wherein said vibration transmission plate and said plurality of vibration detection means are provided such that bisectors of angles made by two line segments each connecting two opposing vibration detection means from among the plurality of vibration detection means coincide with orthogonal axes of anisotropy of said vibration transmission plate.

2. A coordinate determining apparatus according to claim 1, wherein coordinates of the vibration generation source are calculated using a value corresponding to a distance from the vibration generation source to opposing vibration detection means in accordance with a vibration transmission velocity in a direction corresponding to diagonally disposed vibration detection means.

3. A coordinate determining apparatus according to claim 1, wherein the vibrations propagate through said vibration transmission plate as plate waves.

4. A coordinate determining apparatus according to claim 1, wherein the plurality of vibration detection means are disposed at four corners of said vibration transmission plate.

5. A method for controlling a coordinate determining apparatus, said method comprising the steps of:

providing a vibration transmission plate having anisotropic properties such that vibrations from a vibration generation source applied to the vibration transmission plate propagate through the vibration transmission plate with differing vibration transmission velocities depending on a direction of transmission of vibration;

providing a plurality of vibration detection means for detecting vibrations transmitted through the vibration transmission plate;

determining coordinates of the vibration generation source by measuring time periods of propagation of vibrations through the vibration transmission plate from the vibration generation source to one or more of a plurality of vibration detection means; and providing the vibration transmission plate and the plurality of vibration detection means such that bisectors of angles made by two line segments each connecting two opposing vibration detection means from among the plurality of vibration detection means coincide with orthogonal axes of anisotropy of the vibration transmission plate.

6. A method for controlling a coordinate determining apparatus according to claim 5, further comprising the step of calculating, during said determining step, the coordinates of the vibration generation source using a value corresponding to a distance from the vibration generation source to opposing vibration detection means in accordance with a vibration transmission velocity in a direction corresponding to diagonally disposed vibration detection means.

7. A method for controlling a coordinate determining apparatus according to claim 5, further comprising the step of propagating the vibrations through the vibration transmission plate as plate waves.

8. A method for controlling a coordinate determining apparatus according to claim 5, further comprising the step of providing the plurality of vibration detection means at four corners of the vibration transmission plate.

9. A method for controlling a coordinate determining apparatus according to claim 5, further comprising the step of providing the plurality of vibration detection means at opposing sides of the vibration transmission plate.

10. A coordinate determining apparatus according to claim 1, wherein the plurality of vibration detection means are disposed on opposing sides of the vibration transmission plate.

11. A coordinate determining apparatus, comprising:

a vibration transmission plate having anisotropic properties such that vibrations from a vibration generation source applied to said vibration transmission plate propagate through said vibration transmission plate with differing vibration transmission velocities depending on a direction of transmission of vibration;

a plurality of vibration detection means for detecting the vibrations transmitted through the vibration transmission plate, said plurality of vibration detection means being arranged at opposing corners of said vibration transmission plate such that bisectors of angles made by two line segments each connecting two opposing vibration detection means coincide with orthogonal axes of anisotropy of the vibration transmission plate; and determination means for determining coordinates of the vibration generation source by measuring time periods of propagation of vibrations through said vibration transmission plate from the vibration generation source to said vibration detection means.

12. A coordinate determining apparatus according to claim 11, wherein coordinates of the vibration generation source are calculated using a value corresponding to a distance from the vibration generation source to two diagonally disposed detection means in accordance with a vibration transmission velocity in a direction corresponding to the two diagonally disposed vibration detection means.

13. A coordinate determining apparatus according to claim 11, wherein vibrations propagate through said vibration transmission plate as plate waves.

14. A method for controlling a coordinate determining apparatus, comprising the steps of:

providing a vibration transmission plate having anisotropic properties such that vibrations from a vibration generation source applied to the vibration transmission plate propagate through the vibration transmission plate with differing vibration transmission velocities depending o n a direction of transmission of vibration;

providing a plurality of vibration detection means for detecting vibrations transmitted through the vibration transmission plate, the plurality of vibration detection means being arranged at opposing corners of the vibration transmission plate such that bisectors of angles made by two line segments each connecting two opposing vibration detection means coincide with orthogonal axes of anisotropy of the vibration transmission plate; and determining coordinates of the vibration generation source by measuring a time period of propagation of the vibrations through the vibration transmission plate from the vibration generation source to the vibration detection means.

15. A method for controlling a coordinate determining apparatus according to claim 14, further comprising the step of calculating, during said determining step, the coordinates of the vibration generation source using a value corresponding to a distance from the vibration generation source to two diagonally disposed vibration detection means in accordance with a vibration transmission velocity in a direction corresponding to the two diagonally disposed vibration detection means.

16. A method for controlling a coordinate determining apparatus according to claim 14, further comprising the step of propagating the vibrations through the vibration transmission plate as plate waves.

17. A coordinate determining apparatus, comprising:

a vibration transmission plate having anisotropic properties such that vibrations from a vibration generation source applied to said vibration transmission plate propagate through said vibration transmission plate with differing vibration transmission velocities depending on a direction of transmission of vibration;

a plurality of vibration detection means for detecting the vibration transmitted through the vibration transmission plate, said plurality of vibration detection means being arranged at opposing sides of said vibration transmission plate such that bisectors of angles made by two line segments each connecting two opposing vibration detection means coincide with orthogonal axes of anisotropy of the vibration transmission plate; and determination means for determining coordinates of the vibration generation source by measuring time periods of propagation of vibrations through the vibration transmission plate from the vibration generation source to said vibration detection means.

18. A coordinate determining apparatus according to claim 17, wherein coordinates of the vibration generation source are calculated using a value corresponding to a distance from the vibration generation source to two opposing vibration detection means in accordance with a vibration transmission velocity in a direction corresponding to the two opposing vibration detection means.

19. A coordinate determining apparatus according to claim 17, wherein vibrations propagate through said vibration transmission plate as plate waves.

20. A method for controlling a coordinate determining apparatus, comprising the steps of:

providing a vibration transmission plate having anisotropic properties such that vibrations from a vibration generation source applied to the vibration transmission plate propagate through the vibration transmission plate with differing vibration transmission velocities depending on a direction of transmission of vibration;

providing a plurality of vibration detection means for detecting vibrations transmitted through the vibration transmission plate, the plurality of vibration detection means being arranged at opposing sides of the vibration transmission plate such that bisectors of angles made by two line segments each connecting two opposing vibration detection means coincide with orthogonal axes of anisotropy of the vibration transmission plate; and determining coordinates of the vibration generation source by measuring a time period of propagation of the vibrations through the vibration transmission plate from the vibration generation source to the vibration detection means.

21. A method for controlling a coordinate determining apparatus according to claim 20, further comprising the step of calculating, during said determining step, the coordinates of the vibration generation source using a value corresponding to a distance from the vibration generation source to two opposing vibration detection means in accordance with a vibration transmission velocity in a direction corresponding to the two opposing vibration detection means.

22. A method for controlling a coordinate determining apparatus according to claim 20, further comprising the step of propagating the vibrations through the vibration transmission plate as plate waves.

* * * * *

UNITED STATES PATENT AND TRADEMARK OFFICE
CERTIFICATE OF CORRECTION

PATENT NO. : 6,041,284
DATED : March 21, 2000
INVENTOR(S) : Yuichiro Yoshimura, et al.

It is certified that error appears in the above-identified patent and that said Letters Patent is hereby corrected as shown below:

COLUMN 2:

Line 35, "AL" should read --ΔL--.

COLUMN 16:

Line 45, "o n a" should read --on a--.

Signed and Sealed this

Twenty-ninth Day of May, 2001

Attest:

NICHOLAS P. GODICI

*Attesting Officer*  *Acting Director of the United States Patent and Trademark Office*